(12) United States Patent  (10) Patent No.: US 12,700,616 B2
Kim et al.  (45) Date of Patent: Aug. 4, 2026

(54) POUCH TYPE ALL-SOLID-STATE LITHIUM SECONDARY BATTERY AND METHOD FOR PRODUCING THE SAME

(71) Applicant: KOREA BASIC SCIENCE INSTITUTE, Yuseong-gu (KR)

(72) Inventors: Hae Jin Kim, Yuseong-gu (KR); Won Gi Hong, Yuseong-gu (KR); Jong Pil Kim, Dongnae-gu (KR); In Jun Jeon, Andong-si (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 787 days.

(21) Appl. No.: 17/654,358

(22) Filed: Mar. 10, 2022

(65) Prior Publication Data

US 2022/0294013 A1 Sep. 15, 2022

(30) Foreign Application Priority Data

Mar. 12, 2021 (KR) ........................ 10-2021-0032704

(51) Int. Cl.
*H01M 10/0565* (2010.01)
*H01M 4/131* (2010.01)
(Continued)

(52) U.S. Cl.
CPC ....... *H01M 10/0565* (2013.01); *H01M 4/131* (2013.01); *H01M 4/133* (2013.01);
(Continued)

(58) Field of Classification Search
CPC ................. H01M 10/0565; H01M 2300/0082
See application file for complete search history.

(56) References Cited

U.S. PATENT DOCUMENTS 5,919,587 A * 7/1999 Mukherjee .............. H01M 4/48
977/948
2011/0162198 A1 * 7/2011 Kawamoto ......... H01M 4/0433
29/623.1
(Continued)

FOREIGN PATENT DOCUMENTS

CN 106898812 A * 6/2017
JP 2001-345121 A 12/2001
(Continued)

OTHER PUBLICATIONS

CN106898812A translated (Year: 2017).*
(Continued)

*Primary Examiner* — Marla D McConnell
*Assistant Examiner* — Julia S Caserto
(74) *Attorney, Agent, or Firm* — WOMBLE BOND DICKINSON (US) LLP

(57) ABSTRACT

A manufacturing method of an all-solid-state lithium secondary battery including a solid polymer electrolyte, including preparing an all-solid state lithium secondary battery by interposing a polymer electrolyte between a cathode and an anode; hardening the polymer electrolyte by applying a pressure and heat to the all-solid-state lithium secondary battery; activating the all-solid-state lithium secondary battery by applying a current; and removing a gas generated in the activated all-solid state lithium secondary battery. By hardening a polymer electrolyte interposed between a cathode and an anode through applying a pressure and heat, a bubble or dead area inside solid polymer electrolyte is minimized with providing an electrode having uniform thickness. By repeating activation operation and removing gas, bonding of electrode stack is more enhanced, and stability of a battery is improved.

4 Claims, 7 Drawing Sheets

(51) Int. Cl.
   H01M 4/133         (2010.01)
   H01M 10/0525     (2010.01)
   H01M 10/058       (2010.01)

(52) U.S. Cl.
   CPC ..... H01M 10/0525 (2013.01); H01M 10/058
        (2013.01); H01M 2300/0082 (2013.01)

(56)                References Cited

U.S. PATENT DOCUMENTS

| | | | |
|---|---|---|---|
| 2013/0344357 A1* | 12/2013 | Miyake | H01M 10/0585 |
| | | | 29/623.2 |
| 2016/0118649 A1* | 4/2016 | Yamamoto | H01M 4/525 |
| | | | 429/188 |
| 2020/0058940 A1* | 2/2020 | Kim | H01M 4/622 |
| 2020/0266480 A1* | 8/2020 | Deschamps | H01M 4/5825 |
| 2022/0294009 A1* | 9/2022 | Uchida | H01G 11/46 |

FOREIGN PATENT DOCUMENTS

| | | | |
|---|---|---|---|
| JP | 2003036885 A | * | 2/2003 |
| KR | 2000-0012125 A | | 2/2000 |
| KR | 10-2019-0059119 A | | 5/2019 |
| KR | 10-2020-0129379 A | | 11/2020 |

OTHER PUBLICATIONS

JP2003036885A translated (Year: 2003).*
Kim, S.K. et al. Electrochemical Characterization and Mechanical Properties of PEO like Solid Polymer Electrolyte Based on Bisphenol A Ethoxylate Diacrylate. Polymer (Korea). 25, 4, 568-574 (Year: 2001).*
Li, H. et al. Polymer electrolytes for rechargeable lithium metal batteries. Sustainable Energy Fuels. 4, 5469-5487 (Year: 2020).*
Qiao, L. et al. Review Polymer Electrolytes for Sodium Batteries. Journal of The Electrochemical Society. 167, 070534 (Year: 2020).*
Office Action received for Korean Patent Application No. 10-2021-0032704, mailed on Jan. 13, 2023, 8 pages (4 pages of English Translation and 4 pages of Original Document).

* cited by examiner

FIG. 2

Hot press

Electrolyte (liquid)

Electrolyte (solid)

POUCH TYPE ALL-SOLID-STATE LITHIUM SECONDARY BATTERY AND METHOD FOR PRODUCING THE SAME

CROSS-REFERENCE TO RELATED APPLICATION

This application claims the benefit under 35 U.S.C. § 119 of Korean Patent Application No. 10-2021-0032704 filed on Mar. 12, 2021, in the Korean Intellectual Property Office, the entire disclosure of which is incorporated herein by reference for all purposes.

BACKGROUND

1. Field

The following description relates to a pouch type all-solid-state lithium secondary battery and method for producing the same. More specifically, the disclosure relates to a pouch type all-solid-state lithium secondary battery and method for producing the same that forms an internal structure of all-solid-state battery with a large capacity by processing an activation process through repeating charging, discharging, and removing gas and hardening polymer electrolyte interposed between a cathode and an anode by applying pressure and heat.

2. Description of Related Art

As electronic, communication, and computer industries are rapidly developed, a camcorder, cell phone, laptop etc. have been remarkable developed, and a high energy density and stable output of a battery are desired as a power source to operate portable electronic devices. A cheaper and simple process is also desired in manufacturing. An all-solid-state lithium secondary battery is the most actively developed and broadly applied to portable electronic devices among batteries.

The all-solid-state lithium secondary battery must include a cathode, an anode, and electrolyte, and it is charged and discharged by an intercalation or deintercalation of lithium cations reversibly to an electrode. In the charging and discharging process, lithium cations form a charge neutrality with electrons that come to the electrode through a current collector and act as a medium to save an electric energy inside the electrode.

A cathode of the all-solid-state lithium secondary battery refers to an electrode in which lithium cations are implanted in a discharging process of the all-solid-state lithium secondary battery. Since a charge moves to a cathode through an external conducting wire with implanting lithium cations, the cathode is reduced in the discharging process. A transition metal oxide is generally included in the cathode of the all-solid-state lithium secondary battery. The transition metal oxide included in the cathode is called a positive electrode active material. The positive electrode active material generally has a repeated, stereoscopic structure.

On the other hand, an anode of the all-solid-state lithium secondary battery refers to an electrode in which lithium cations are deintercalated in the discharging process of the all-solid-state lithium secondary battery. Since a charge escapes through an external conducting wire with the deintercalation of lithium cations, the anode is oxidized in the discharging process. The anode of the all-solid-state lithium secondary battery generally includes lithium metal, carbon material, and non-carbon material, etc. The carbon material, etc. included in the anode is called a negative electrode active material.

In order to maximize a performance of the all-solid-state lithium secondary battery, a negative electrode active material is generally supposed to have the following critical conditions. i) an amount of electricity to save per unit weight should be large, ii) a density of the negative electrode active material per unit volume should be high, and iii) a structural change due to intercalation and deintercalation of lithium ions should be minor. When the structural change is intense, a strain may be accumulated inside the structure according to charging and discharging, and therefore, an irreversible intercalation and deintercalation of lithium ions may be caused.

After an electrode assembly is built and assembled in a battery case with an electrolyte, the all-solid-state lithium secondary battery is processed by an activation process. The activation process may stabilize a battery structure through charging, aging, and discharging an assembled battery and make the battery usable.

The charging, aging, and discharging processes may produce a lot of gas generated by a side reaction between a gas caused from a positive electrode active material, negative electrode active material, electrolyte, and a separation membrane and the positive electrode active material and negative electrode active material, or a side reaction between the separation membrane and the electrolyte. A gas generated afterwards is removed through an opened or cut outlet, and the outlet is sealed again by heat. As above, the process of removing gas inside a battery cell and sealing the outlet is called a degassing process.

When the generated gas inside a battery cell is not efficiently removed in the activation process, the gas may interrupt a movement of lithium ions between facing electrodes, resulting in interruption of a uniform formation. It may be also bad for a battery performance such as capacity or output, etc. and a battery life. Additionally, a capacity of battery is rapidly deteriorated according to an increased number of charging and discharging due to the existing gas inside a battery cell, and the battery cell may swell.

Therefore, in a typical manufacturing method of battery, a pouch type unit cell is connected to a gas pocket, etc. to make a gas generated in the activation process move to a region of the gas pocket, etc. However, this method is for emitting the gas inside the battery cell by a natural movement based on a pressure difference between the gas pocket and the inside of the battery cell. There is a limitation to efficiently remove gas occupying a certain space inside the battery cell only by the pressure difference between the gas pocket and the inside of the battery cell.

Meanwhile, since a currently used all-solid-state lithium secondary battery utilizes an electrolyte having a combustible organic solvent, there may be a serious safety issue in an external impact, etc. Therefore, an additional material or safety device is desired to improve a safety apart from a basic structure of a battery cell, which is a demerit. An all-solid-state battery replaces the typical organic electrolyte with a solid electrolyte, and it attracts attentions as a next generation battery to fundamentally solve the safety issue.

In order to manufacture the all-solid-state battery, a technical art is being desired to minimize a bubble or dead area in a solidification of a solid electrolyte and to form a uniform thickness.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a manufacturing method of an all-solid-state lithium secondary battery including a solid polymer electrolyte may include preparing an all-solid-state lithium secondary battery by interposing a polymer electrolyte between a cathode and an anode; hardening the polymer electrolyte by applying a pressure and heat to the all-solid-state lithium secondary battery; activating the all-solid-state lithium secondary battery by applying a current, which refers to an operation of an initial formation of a battery by applying a current; and removing a gas generated in the activated all-solid-state lithium secondary battery.

The activating and the removing a gas may be repeated 2 to 5 times, but it is not limited thereto.

The pressure may be 500 Pa to 2,000 Pa, but it is not limited thereto.

The heat may be 80° C. to 100° C. and applied for 30 to 120 minutes, but it is not limited thereto.

The current may be 0.05 C to 0.2 C, but it is not limited thereto.

The polymer electrolyte may be selected from a group composing of a polyethylene glycol dimethyl ether, bisphenol A, polyethylene derivatives, polyethylene oxide derivatives, polypropylene oxide derivatives, phosphate ester polymer, poly agitation lysine, polyester sulfide, polyvinyl alcohol, polyvinylidene fluoride, polymer including an ionic dissociator, $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$ and their combinations, but it is not limited thereto.

The cathode may be selected from a group composing of $LiFePO_4$, $LiNi_{0.5}Mn_{1.5}O_4$, $LiNiCoAlO_2$, $LiMn_2O_4$, $LiCoO_2$, $LiNiCoMnO_2$, lithium nickel cobalt manganese aluminum, and their combinations, but it is not limited thereto.

The anode may be selected from a group composing of an artificial graphite, natural graphite, graphene, metal oxide, Si, $SiO_x$, $Li_4Ti_5O_{12}$ and their combinations, but it is not limited thereto.

The cathode and the anode may further include an ion conductive material and a lithium salt and form a composite electrode, but it is not limited thereto.

In 100 parts by weight of the cathode or anode, a solid polymer electrolyte may be included in 5 to 15 parts by weight, but it is not limited thereto.

For an all-solid-state lithium secondary battery including a cathode, a solid polymer electrolyte, and an anode, the disclosure may provide an all-solid-state lithium secondary battery including a solid polymer electrolyte manufactured by the manufacturing method of an all-solid-state lithium secondary battery including the solid polymer electrolyte, wherein the solid polymer electrolyte is formed between the cathode and the anode.

Other features and aspects will be apparent from the following detailed description, the drawings, and the claims.

BRIEF DESCRIPTION OF THE DRAWINGS

FIG. 2 is a schematic diagram of a manufacturing method of an all-solid-state lithium secondary battery including a solid polymer electrolyte in accordance with one or more embodiments.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
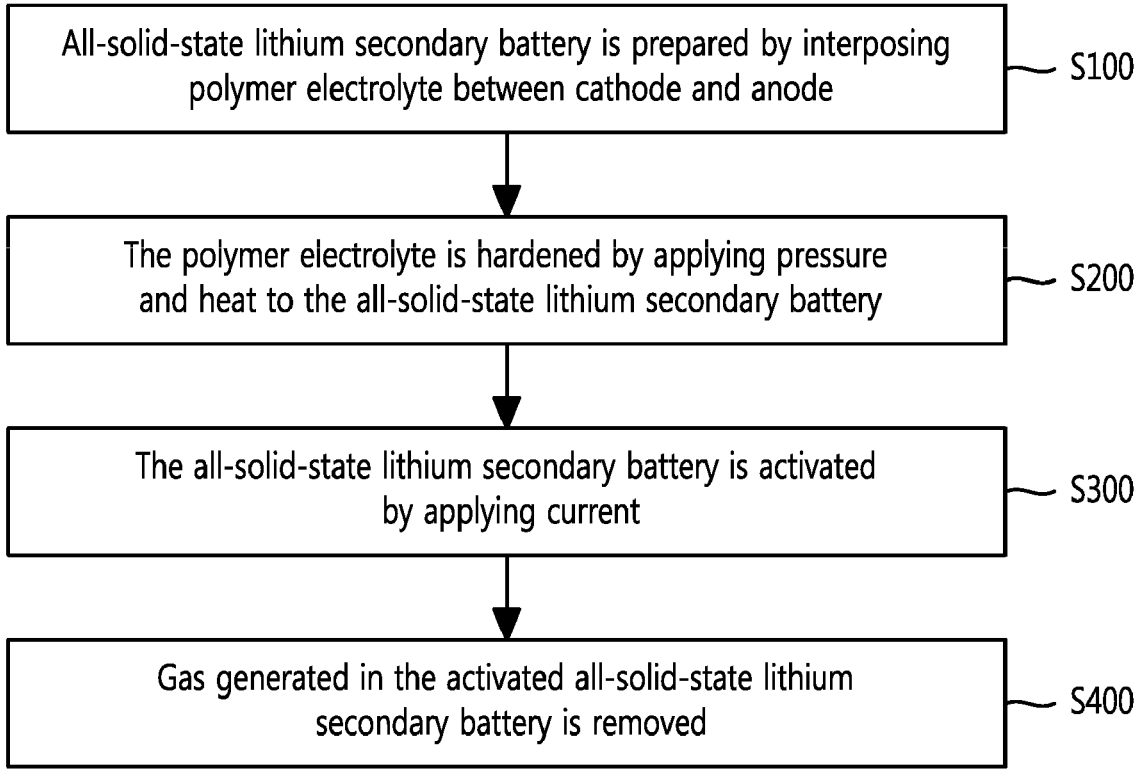
FIG. 1 is a flow chart of a manufacturing method of an all-solid-state lithium secondary battery including a solid polymer electrolyte in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The disclosure relates to a manufacturing method of a pouch type all-solid-state lithium secondary battery to solve problems of the above-described typical art. By hardening a polymer electrolyte interposed between a cathode and an anode through applying a pressure and heat, the disclosure may minimize a bubble or dead area inside a solid polymer electrolyte with providing an electrolyte layer having a uniform thickness. Accordingly, the disclosure may give a uniform ion conductivity to the entire electrode and minimize an interfacial resistance between electrode-electrolyte layer, which is the first objective of the disclosure.

Additionally, by repeating activation, charging/discharging and removing gas processes, the disclosure may form an internal structure of an all-solid-state battery having a high capacity and stability, which is the second objective of the disclosure.

A detailed description for an all-solid-state lithium secondary battery including a solid polymer electrolyte and manufacturing method thereof is given with attached drawings and embodiments. However, the disclosure is not limited by the drawings and embodiments.

The disclosure relates to a manufacturing method of an all-solid-state lithium secondary battery including a solid polymer electrolyte comprising preparing an all-solid-state lithium secondary battery by interposing a polymer electrolyte between a cathode and an anode; hardening the polymer electrolyte by applying a pressure and heat to the all-solid-state lithium secondary battery; activating the all-solid-state lithium secondary battery by applying a current, which refers to an operation of an initial formation of a battery by applying a current; and removing a gas generated in the activated all-solid-state lithium secondary battery.

By hardening the polymer electrolyte through applying a pressure and heat, which is interposed between the cathode and the anode, a manufacturing method of an all-solid-state lithium secondary battery including a solid polymer electrolyte of the disclosure may minimize a bubble or dead area inside the solid polymer electrolyte and may provide an electrolyte layer having a uniform thickness. Also, an ion conductivity may be improved by minimizing an interfacial resistance. Further, since the uniform ion conductivity is given by forming the solid polymer electrolyte having a uniform thickness, an imbalance of capacity of the all-solid-state lithium secondary battery for each location may be tackled.

FIG. 1 is a flow chart of a manufacturing method of an all-solid-state lithium secondary battery including a solid polymer electrolyte in accordance with one or more embodiments.

First of all, the all-solid-state lithium secondary battery may be prepared by interposing the polymer electrolyte between the cathode and the anode (S100).

In a typical all-solid-state lithium secondary battery using an electrolyte having a combustible organic solvent, the electrolyte is implanted after assembling an electrode assembly having a cathode and an anode. On the other hand, a manufacturing method of an all-solid-state lithium secondary battery including a solid polymer electrolyte of the disclosure may prevent a problem that the electrolyte is not formed uniformly when performing the above typical method. Accordingly, after the electrolyte is interposed between the cathode and the anode, an electrode including a solid polymer electrolyte having a uniform thickness may be formed by applying a pressure and heat.

The cathode may be selected from a group composing of $LiFePO_4$, $LiNi_{0.5}Mn_{1.5}O_4$, $LiNiCoAlO_2$, $LiMn_2O_4$, $LiCoO_2$, $LiNiCoMnO_2$, lithium nickel cobalt manganese aluminum, and their combinations, but it is not limited thereto.

The cathode may utilize or manufacture a common cathode known in relevant fields. In one example, after a slurry is manufactured by mixing and stirring a solvent, binder, conductive agent, and dispersant into a positive electrode active material, the cathode may be formed by coating the slurry to a current collector of metal material, pressing and drying it.

The current collector of metal material may be a metal with a high conductivity, to which the slurry of the positive electrode active material may be easily attached. When a metal has a high conductivity with not causing a chemical change of a battery in a voltage range of the battery, it is not limited by a specific metal. In one example, a stainless steel, aluminum, nickel, titanium, baked carbon, or a surface of aluminum or stainless steel processed by carbon, nickel, titanium, or silver, etc. may be used. Additionally, a slight bump may be formed on a surface of the current collector to enhance an adhesion of the positive electrode active material. The current collector may be a film, sheet, foil, net, porous material, foam, or non-woven fabric material, etc., and its thickness may be adjusted according to a usage.

The positive electrode active material may be a compound substituted by a layered compound such as lithium cobalt oxide [LixCoO$_2$(0.5<x<1.3)], lithium nickel oxide [Li$_x$NiO$_2$ (0.5<x<1.3)], etc. or additional transition metal; lithium manganese oxide of the chemical formula Li$_{1+x}$Mn$_{2-x}$O$_4$ (herein, x is 0 to 0.33), LiMnO$_3$, LiMn$_2$O$_3$, or [Li$_x$MnO$_2$ (0.5<x<1.3)]; lithium copper oxide (Li$_2$CuO$_2$); vanadium oxide of LiV$_3$O$_8$, LiFe$_3$O$_4$, V$_2$O$_5$, or Cu$_2$V$_2$O$_7$, etc.; Ni-site type lithium nickel oxide represented by the chemical formula LiNi$_{1-x}$M$_x$O$_2$ (herein, M=Co, Mn, Al, Cu, Fe, Mg, B or Ga, and x=0.01 to 0.3); lithium manganese complex oxide represented by the chemical formula LiMn$_{2-x}$M$_x$O$_2$ (herein, M=Co, Ni, Fe, Cr, Zn or Ta, and x=0.01 to 0.1) or Li$_2$Mn$_3$MO$_8$ (herein, M=Fe, Co, Ni, Cu or Zn); LiMn$_2$O$_4$ in which some of Li in the chemical formula is substituted by alkali earth metal ion; disulfide compound; Fe$_2$(MoO$_4$)$_3$, etc. An example of the layered compound of lithium cobalt oxide [LixCoO$_2$(0.5<x<1.3)] or lithium nickel oxide [Li$_x$NiO$_2$(0.5<x<1.3)] substituted by additional transition metal may be lithium-manganese-cobalt oxide.

The solvent to form the cathode may be an organic solvent such as N-methyl pyrrolidone (NMP), dimethyl formamide (DMF), acetone, dimethyl acetamide, etc. or water. The solvent may be used solely or mixed with 2 or more materials. An amount of the used solvent may be determined by considering a coating thickness of the slurry and manufacturing yield enough to dissolve and disperse the positive electrode active material, binder, and conductive agent.

The binder may be the one among various binder polymers such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, a styrene-butadiene rubber (SBR), a fluorine rubber, polyacrylic acid, and a polymer having hydrogen thereof substituted with Li, Na, and Ca, or various copolymers.

The conductive agent may not be limited particularly when it has conductivity not to cause a chemical change to a battery. In one example, a conductive material such as graphite like natural graphite and artificial graphite; carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon, aluminum, or nickel powder; conductive whiskers such as zinc oxide and potassium titanate; conductive metal oxide such as titanium oxide; or polyphenylene derivatives may be used.

The dispersant may be an aqueous-based dispersant or an organic dispersant such as N-methyl-2-pyrrolidone.

The anode may be selected from a group composing of an artificial graphite, natural graphite, graphene, metal oxide, Si, SiO$_x$, Li$_4$Ti$_5$O$_{12}$ and their combinations, but it is not limited thereto.

A negative electrode active material used in the anode may be a carbon material, lithium metal, silicon, or tin where lithium ions are generally occluded and emitted. A carbon material may be desirable, and low-crystalline carbon or high-crystalline carbon may be used all for the carbon material. Representative low-crystalline carbons are soft carbon and hard carbon. Representative high-crystalline carbons are high-temperature baked carbons such as natural graphite, kish graphite, pyrolytic carbon, mesophase pitch based carbon fiber, meso-carbon microbeads, mesophase pitches petroleum or coal tar pitch derived cokes, etc.

A negative current collector may generally have a thickness of 3 μm to 500 μm. The negative current collector may not be limited particularly when it has conductivity not to cause a chemical change to a battery. In one example, copper, stainless steel, aluminum, nickel, titanium, baked carbon, a surface of copper or stainless steel processed by carbon, nickel, titanium, silver, etc., or aluminum-cadmium alloy may be used. Additionally, like a positive current collector, a slight bump may be formed on a surface to enhance an adhesion of the negative electrode active material, and the current collector may be used as a film, sheet, foil, net, porous material, foam, or non-woven fabric material, etc.

The binder and conductive agent used in the anode may be the ones that are generally used in the relevant field, like the cathode. After a negative electrode active material slurry is manufactured by mixing and stirring the additives and the negative electrode active material, the anode may be formed by coating the slurry to the current collector, pressing and drying it.

The cathode and the anode may further include an ion conductive material and a lithium salt and form a composite electrode.

The composite electrode may facilitate an internal movement and diffusion of lithium ions by additionally including the ion conductive material and lithium salt.

The ion conductive material may include poly(ethylene glycol) dimethylehter (PEGDME).

A ratio between the ion conductive material and the binder may be 2:1 or 1:2, but it is not limited thereto.

When an amount of the ion conductive material is larger than that of the binder, a conductivity of lithium ions may be improved. When an amount of the binder is larger than that of the ion conductive material, an electrode may be formed more stably.

The lithium salt may include lithium salt selected from a group composing of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloro borane lithium, low-aliphatic series carboxylic acid lithium, 4-phenyl boracic acid lithium and their combinations.

The polymer electrolyte may be polyethylene glycol dimethyl ether or bisphenol A, but it is not limited thereto.

The polymer electrolyte may use a general solid electrolyte known in the relevant field.

Examples of the solid electrolyte may be organic solid electrolyte such as polyethylene derivatives, polyethylene oxide derivatives, polypropylene oxide derivatives, phosphate ester polymer, poly agitation lysine, polyester sulfide, polyvinyl alcohol, polyvinylindene fluoride, polymer including an ionic dissociator, etc. Additionally, examples of the solid electrolyte may be inorganic solid electrolyte such as Li nitride, halide, or sulphate of Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$, etc.

In 100 parts by weight of the anode, the solid polymer electrolyte may be included in 5 to 15 parts by weight, but it is not limited thereto.

In 100 parts by weight of the cathode, the solid polymer electrolyte may be included in 5 to 15 parts by weight, but it is not limited thereto.

Next, the polymer electrolyte may be hardened by applying a pressure and heat to the all-solid-state lithium secondary battery (S200).

The polymer electrolyte may further include a lithium salt, initiator, cross-liking agent, plasticizer, and additive, etc.

The initiator may harden the polymer electrolyte.

The cross-liking agent may include diacrylate or triacrylate.

The plasticizer may be a compound based on ethylene glycol and may include a material selected from a group composing of PEG (Poly ethylene glycol), PEGME (poly (ethylene glycol)monomethylether), PEGDME (poly(ethylene glycol) Dimethylether), TEG (tetraethylene glycol), TEGDME (tetraethylene glycol dimethyl Ether), Tetraglyme, EC (ethylene carbonate), PC (propylene carbonate), DMP (dimethyl Phthalate), DEP (diethyl phthalate), DBP (dibutyl phthalate), DOP (dioctyl Phthalate), CP (cyclic phosphate) and their combinations.

The all-solid-state lithium secondary battery may further include an additive to improve charging/discharging characteristics or flame retardance, etc. In one example, pyridine, triethylphosphate, triethanolamine, cyclic ether, ethylene diamine, n-glyme, hexaphosphoric triamide, nitrobenzene derivative, sulfur, quinone imine dye, N-substituted oxazolidinone, N,N-substituted imidazolidine, ethylene glycol dialkyl ether, ammonium salt, pyrrole, 2-methoxyethanol, or aluminum trichloride may be further added. In some cases, a solvent having halogen such as carbon tetrachloride, ethylene trifluoride etc. may be further included to give a non-inflammability. Carbon dioxide gas may be further included to improve high-temperature storage characteristics, and FEC (Fluoro-Ethylene carbonate), PRS (Propenesultone), FEC (Fluoro-Ethlene carbonate) may be further included.

The pressure may be 500 Pa to 2,000 Pa, but it is not limited thereto.

When the pressure is under 500 Pa, the polymer electrolyte may be formed unevenly. When the pressure is over 2,000 Pa, a battery may be damaged due to the excessive pressure.

The pressure applied to the all-solid-state lithium secondary battery may be applied with an additional pressure means from an outside of the all-solid-state lithium secondary battery.

The heat may be 80° C. to 100° C. and applied for 30 to 120 minutes, but it is not limited thereto.

The heat may be desirable in a temperature range to vaporize the solvent of the polymer electrolyte and to harden the polymer electrolyte.

The heat applied to the all-solid-state lithium secondary battery may use an additional heating means from an outside of the all-solid-state lithium secondary battery.

The heating means is not particularly limited. In one example, it may directly apply the heat by contacting through an outer surface of the all-solid-state lithium secondary battery. Or, it may apply the heat through a high-temperature atmosphere by locating the all-solid-state lithium secondary battery to a high-temperature chamber, etc.

Figure 2:
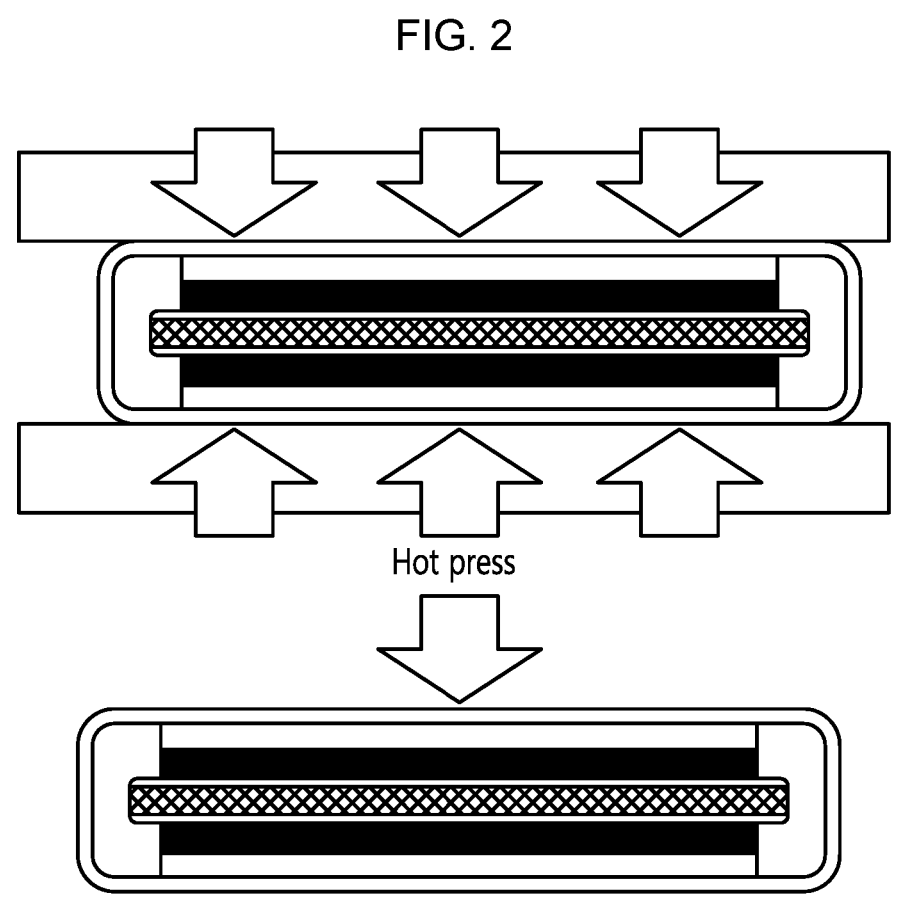

FIG. 2 is a schematic diagram of a manufacturing method of an all-solid-state lithium secondary battery including a solid polymer electrolyte in accordance with one or more embodiments.

Specifically, FIG. 2 is a schematic diagram to harden the polymer electrolyte by applying a pressure and heat to the all-solid-state lithium secondary battery.

Generally, a polymer electrolyte is not uniformly formed due to viscosity, and there may be a bubble or dead area. To solve the problem, the disclosure may form a solid polymer electrolyte by applying a pressure and heat, and accordingly, the solid polymer electrolyte may be formed uniformly between the cathode and the anode.

Figure 3:
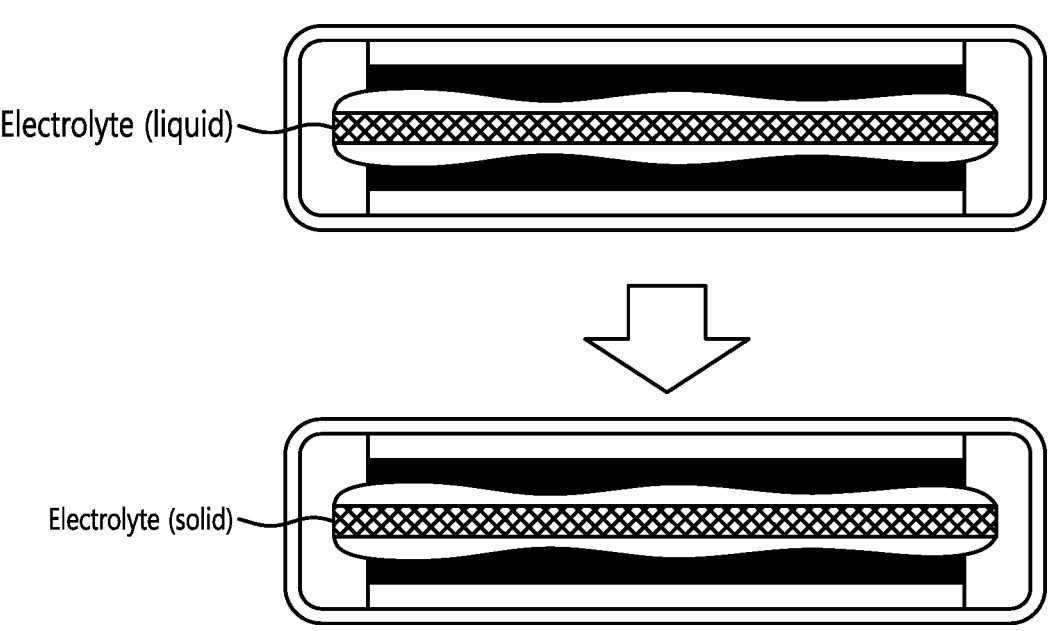
FIG. 3 is a schematic diagram of a typical manufacturing method of an all-solid-state lithium secondary battery including a solid polymer electrolyte.

FIG. 3 is a schematic diagram of a typical manufacturing method of an all-solid-state lithium secondary battery including a solid polymer electrolyte.

In a typical all-solid-state lithium secondary battery including a solid polymer electrolyte, the solid polymer electrolyte is changed to a solid-phase electrolyte with an imbalanced state because of viscosity of the polymer electrode like FIG. 3, and therefore, it is not uniform entirely.

Continuously, the all-solid-state lithium secondary battery may be activated by applying a current (S300).

The activation process may include charging, aging, and discharging process.

The current may be 0.05 C to 0.2 C, but it is not limited thereto.

The current may refer to that 1 C is 100 mA/g to 500 mA/g. However, mA/g range according to the 1 C may be adjusted based on a material of the all-solid-state lithium secondary battery.

In one example, the current may refer to that 1 C is 0.05 C to 0.2 C in 170 mA/g.

Continually, a gas generated in the activated all-solid-state lithium secondary battery may be removed (S400).

In the removing the gas, the gas generated in the activated all-solid-state lithium secondary battery may be emitted outside.

In an initial cycle of the all-solid-state lithium secondary battery, removing the gas may prevent that bondings of electrode-electrolyte and electrode-isolation film-electrode are loosened due to a decomposition of an electrolyte.

By removing the gas after the activation, a remaining gas or byproduct generated by the decomposition of the electrolyte inside the all-solid-state lithium secondary battery may be emitted outside, which may enhance an internal electrode stack bonding.

The activation operation and removing the gas may be repeated 2 to 5 times, but it is not limited thereto.

Especially, a manufacturing method of an all-solid-state lithium secondary battery including a solid polymer electrolyte of the disclosure may repeat the activation operation and removing the gas, and accordingly, the bonding of electrode stack may be more enhanced, and a battery may be more stabilized.

By repeating the activation operation and removing operation of gas, an internal structure of all-solid-state battery may have a high capacity and stability. Accordingly, a manufactured all-solid-state lithium secondary battery may have an increased specific capacity.

In a typical secondary battery, a sharp object such as a nail or drill may penetrate a battery case and invade a cathode and an anode coated by an active material. When a battery is pressed by a tool such as a nipper, a lot of current may flow momentarily into the cathode, the anode, and internal short circuits of the cathode and anode simultaneously, resulting in a heat. In a worse case, a battery may be exploded or fired. However, an all-solid-state lithium secondary battery of the disclosure may not be exploded and stably activated even when it is cut by scissors.

In the activation operation, a battery case of the all-solid-state lithium secondary battery may be sealed except for an outlet to emit gas, and then the gas may be removed. After that, the battery case may be completely sealed, finishing manufacturing the all-solid-state lithium secondary battery.

The all-solid-state lithium secondary battery may be a pouch type, cylinder type, tower type, or coin type, but the pouch type may be desirable most.

For an all-solid-state lithium secondary battery including a cathode, a solid polymer electrolyte and an anode, the disclosure relates to an all-solid-state lithium secondary battery including a solid polymer electrolyte manufactured by the above manufacturing method of the all-solid-state lithium secondary battery including the solid polymer electrolyte, wherein the solid polymer electrolyte is formed between the cathode and the anode.

Since the all-solid-state lithium secondary battery has improved charging characteristics, cycle characteristics and high rate, it may be used for a power source of various electronic devices. Examples of the electronic devices are air conditioner, washing machine, TV, refrigerator, freezer, cooler, laptop, tablet, smartphone, PC keyboard, PC display, desktop, CRT monitor, printer, all-in-one PC, mouse, hard disk, peripherals, iron, clothes dryer, window fan, transceiver, fan, ventilation fan, TV, music recorder, music player, oven, microwave, toilet with cleaning function, hot air heater, car component, vehicle navigation system, flashlight, humidifier, portable karaoke machine, ventilation fan, dryer, air purifier, mobile phone, emergency light, game machine, blood pressure monitor, coffee grinder, coffee maker, kotatsu, copier, disc changer, radio, razor, juicer, shredder, water purifier, lighting fixtures, dehumidifier, dish dryer, rice cooker, stereo, stove, speaker, trouser press, vacuum cleaner, body fat scale, body scale, home bathroom scales, video player, electric blanket, electric rice cooker, electric desk lamp, electric kettle, electronic game console, portable game console, electronic dictionary, electronic organizer, microwave oven, microwave cooker, electronic calculator, electric cart, electric wheelchair, electric tool, electric toothbrush, electric heater, hair clipper, telephone, clock, intercom, air circulator, blitz insecticide, hot plate, toaster, hair dryer, electric drill, hot water heater, panel heater, grinder, soldering iron, video camera, VCR, facsimile, food processor, blanket dryer, headphone, microphone, massager, mixer, sewing machine, rice cake machine, floor heating panel, lantern, remote control, cooler, water cooler, air cooler, word processor, whisk, electronic musical instrument, motorcycle, toy, lawn mower, float, bicycle, automobile, hybrid vehicle, plug-in hybrid vehicle, electric vehicle, railway, ship, airplane, emergency battery, etc.

The disclosure will be described in more detailed way with embodiments below, but the embodiments are merely for description and not intended to restrict the scope of the disclosure.

[Manufacturing Embodiment 1]

A slurry is manufactured by mixing lithium iron phosphate 70 wt %, super P 8 wt % as a conductive agent, polyvinylidene fluororide as a binder, polyethylene glycol dimethyl ether and lithium salt 22 wt % as ion conductive materials (binder:ion conductive material are mixed with 1:2 or 2:1) and NMP (N-methyl-2-pyrrolidine). The slurry is coated to aluminum foil, dried and rolled, making a cathode and an anode.

A negative electrode active material slurry is manufactured by adding graphite 70 wt % as a negative electrode active material, super-p 8.0 wt % as a conductive agent, polyvinylidene fluororide as a binder, polyethylene glycol dimethyl ether and lithium salt 22 wt % as ion conductive materials (binder:ion conductive material are mixed with 1:2 or 2:1) to a solvent, NMP. The manufactured negative electrode active material slurry is coated to a copper (Cu) thin film, which is a negative current collector with 10 μm thickness, and dried to make an anode. Then, a roll press is performed to make the anode.

An electrolyte is manufactured by mixing polyethylene glycol dimethyl ether, lithium salt ($LiPF_6$), bisphenol A, initiator, and FEC.

The electrolyte is interposed between the cathode and the anode. After that, the electrolyte is hardened to make a solid polymer electrode by pressurizing 1,000 Pa at 90° C. with using a pressure device, manufacturing an all-solid-state lithium secondary battery.

Embodiment 1

Continuously, the all-solid-state lithium secondary battery is activated by applying a current of 0.05 C.

A gas generated inside the activated all-solid-state lithium secondary battery is removed.

The activation and removing operation are repeated one more time.

[Comparative Manufacturing Embodiment 1]

After the electrolyte is interposed between the cathode and the anode, applying a pressure and heat is not performed. An all-solid-state lithium secondary battery is manufactured with the same method of the Manufacturing Embodiment 1 except for that.

[Comparative Embodiment 1]

The all-solid-state lithium secondary battery manufactured in the Comparative Manufacturing Embodiment 1 is activated with removing gas in the same method of the Embodiment 1.

[Evaluation]

1. Analysis on Characteristics of a Battery

Characteristics of all-solid-state lithium secondary battery of Embodiment 1 and Comparative Embodiment 1 are analyzed, and the results are illustrated in FIG. 4 to FIG. 7.

Figure 4:
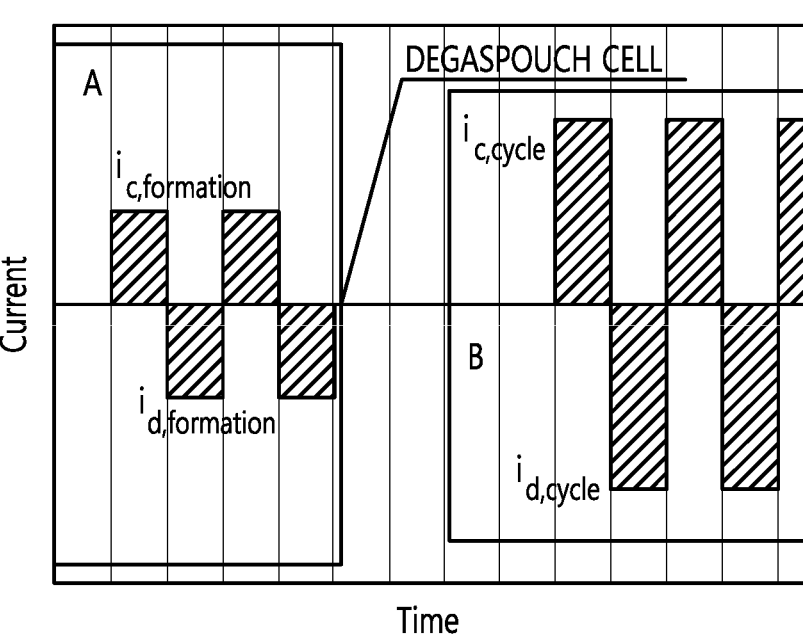
FIG. 4 is a graph illustrating a current applied to the all-solid-state lithium secondary battery manufactured by the Embodiment 1.

FIG. 4 is a graph illustrating a current applied to the all-solid-state lithium secondary battery manufactured by the Embodiment 1.

Specifically, 'A' of FIG. 4 is a graph that illustrates applying a current according to the activation and removing gas. 'B' of FIG. 4 is a graph that illustrates applying a current when performing charging/discharging cycle after the activation operation.

Figure 5:
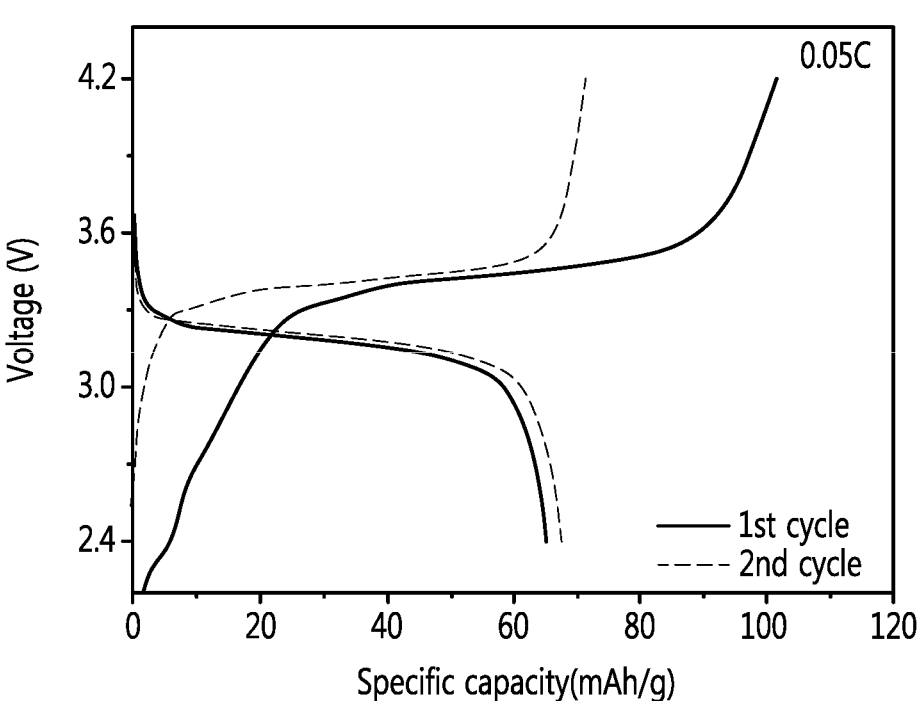
FIG. 5 is a graph illustrating aspects of charging/discharging the all-solid-state lithium secondary battery corresponding to 'A' of FIG. 4.

FIG. 5 is a graph illustrating aspects of charging/discharging the all-solid-state lithium secondary battery corresponding to 'A' of FIG. 4.

According to the result of FIG. 5, when performing the activation and removing gas one time, a charging/discharging capacity is asymmetric. However, by performing the activation and removing gas 2 times, the charging/discharging capacity becomes symmetric. That is, it may be shown that repeating the activation and removing gas may improve a stability of the all-solid-state lithium secondary battery.

Figure 6:
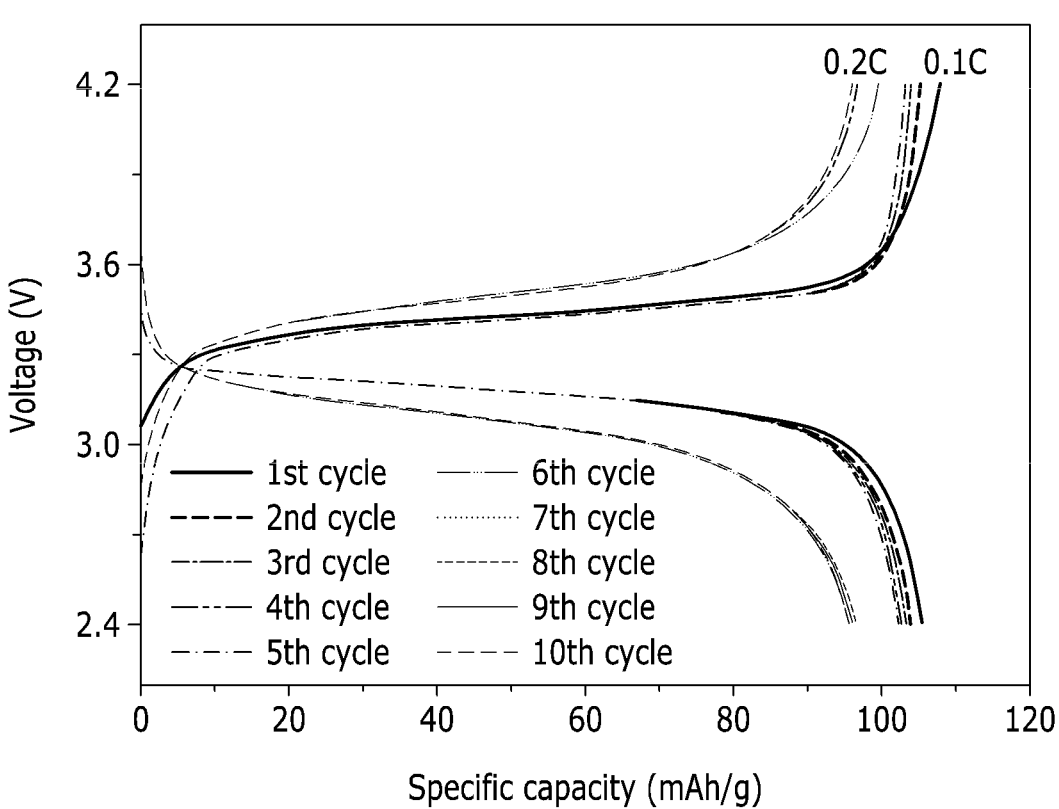
FIG. 6 is a graph illustrating aspects of charging/discharging the all-solid-state lithium secondary battery corresponding to 'B' of FIG. 4.

FIG. 6 is a graph illustrating aspects of charging/discharging the all-solid-state lithium secondary battery corresponding to 'B' of FIG. 4.

According to the result of FIG. 6, a specific capacity of the all-solid-state lithium secondary battery may increase after performing the activation and removing gas.

Figure 7:
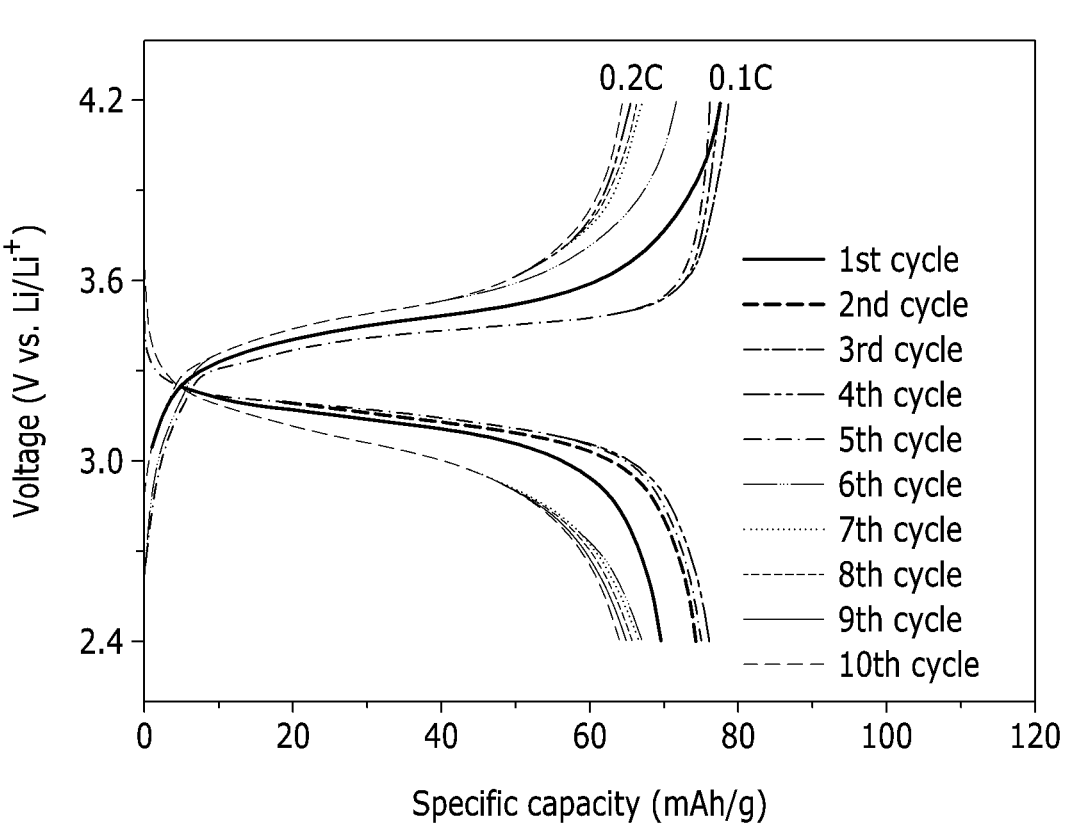
FIG. 7 is a graph illustrating aspects of charging/discharging the all-solid-state lithium secondary battery manufactured by the Comparative Embodiment 1.

FIG. 7 is a graph illustrating aspects of charging/discharging the all-solid-state lithium secondary battery manufactured by the Comparative Embodiment 1.

According to the result of FIG. 7, the specific capacity of Comparative Embodiment 1, which is manufactured without applying a pressure and heat, is lower than that of Embodiment 1. Accordingly, like the embodiment of the disclosure, a specific capacity and stability of cycle may increase by applying a pressure and heat to an electrolyte interposed between a cathode and an anode.

By applying a pressure and heat to an electrolyte interposed between a cathode and an anode, an interfacial resistance between an electrode and electrolyte may be minimized, resulting in improving an ion conductivity. Therefore, the specific capacity of all-solid-state lithium secondary battery may increase. Additionally, since the electrolyte is uniformly distributed on the electrode, the ion conductivity may be uniform, and capacities for each location of all-solid-state lithium secondary battery may be uniform.

Also, by repeating the activation and removing gas, a stability of all-solid-state lithium secondary battery may be more improved.

The disclosed art may have effects as follows. However, it does not mean that a specific embodiment should include all the effects or only the effects, and therefore, the disclosure should not be limited by the below descriptions.

A manufacturing method of all-solid-state lithium secondary battery including a solid polymer electrolyte according to the disclosure may minimize a bubble or dead area inside the solid polymer electrolyte and provide an electrolyte layer having a uniform thickness, by hardening the polymer electrolyte interposed between a cathode and an anode through applying a pressure and heat. Also, an ion conductivity may be improved by minimizing an interfacial resistance. Further, since the solid polymer electrolyte with the uniform thickness is formed, the ion conductivity may be uniform. Therefore, an imbalance of capacities for each location of all-solid-state lithium secondary battery may be solved.

Moreover, a manufacturing method of all-solid-state lithium secondary battery including a solid polymer electrolyte of the disclosure may enhance a bonding of electrode stack and stability of a battery by repeating an activation operation and removing gas.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A manufacturing method of an all-solid-state lithium secondary battery including a solid polymer electrolyte, comprising:

preparing an all-solid-state lithium secondary battery by interposing a polymer electrolyte between a cathode composite electrode and an anode composite electrode;

hardening the polymer electrolyte to form a solid polymer electrolyte by simultaneously applying a pressure of 500 Pa to 2,000 Pa and heat of 80° C. to 100° C. for 30 to 120 minutes to the all-solid-state lithium secondary battery;

activating the all-solid-state lithium secondary battery by applying a current of 0.05 C to 0.2 C; and removing a gas generated in the activated all-solid-state lithium secondary battery, wherein the activating and the removing a gas are repeated 2 to 5 times, wherein the cathode composite electrode and the anode composite electrode are formed to include polyethylene glycol dimethyl ether as an ion conductive material, a lithium salt, a binder, and a conductive agent, wherein the polymer electrolyte comprises polyethylene glycol dimethyl ether, bisphenol A, and an initiator, wherein the polymer electrolyte comprises polyethylene glycol dimethyl ether, and wherein the ion conductive material and the binder in each of the cathode composite electrode and the anode composite electrode are mixed in a ratio of 2:1 to 1:2.

2. The manufacturing method of an all-solid-state lithium secondary battery including a solid polymer electrolyte of claim 1, wherein the cathode composite electrode is selected from a group composing of $LifePO_4$, $LiNi_{0.5}Mn_{1.5}O_4$, $LiNiCoAlO_2$, $LiMn_2O_4$, $LiCoO_2$, $LiNiCoMnO_2$, lithium nickel cobalt manganese aluminum, and their combinations.

3. The manufacturing method of an all-solid-state lithium secondary battery including a solid polymer electrolyte of claim 1, wherein the anode composite electrode is selected from a group composing of an artificial graphite, natural graphite, graphene, metal oxide, Si, $SiO_x$, $Li_4Ti_5O_{12}$ and their combinations.

4. The manufacturing method of an all-solid-state lithium secondary battery including a solid polymer electrolyte of claim 1, wherein the solid polymer electrolyte formed by hardening is interposed as a separate layer between the cathode composite electrode and the anode composite electrode, and wherein in 100 parts by weight of each of the cathode composite electrode and the anode composite electrode, the polyethylene glycol dimethyl ether as the ion conductive material is included in 5 to 15 parts by weight.

* * * * *